Aug. 15, 1939.  H. E. SMITH  2,169,297
WORKBOX
Filed Feb. 25, 1937
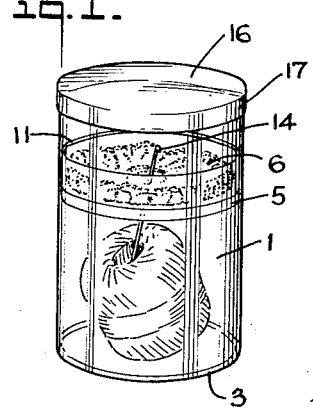
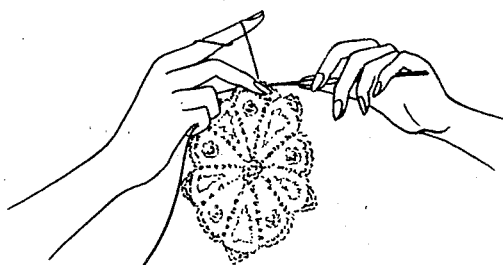
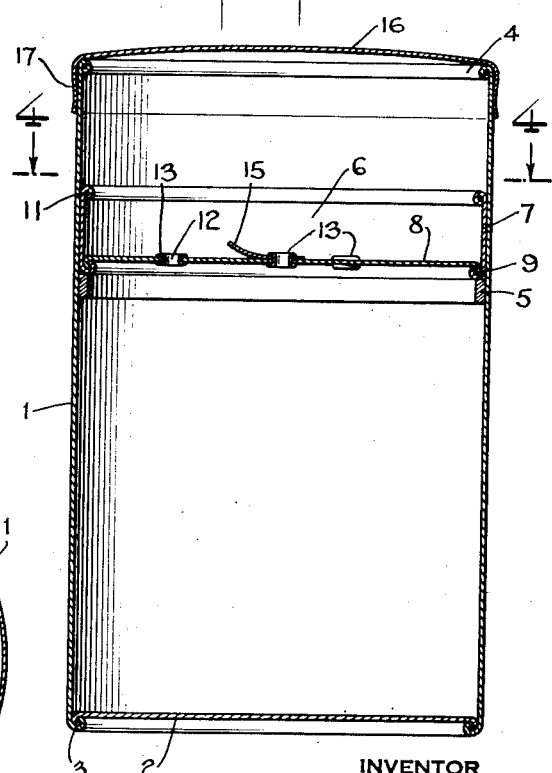
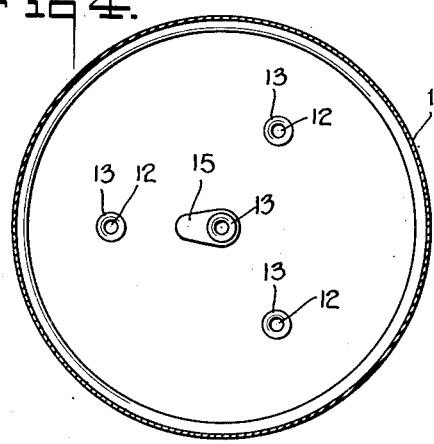
INVENTOR
Harry E. Smith
BY
ATTORNEYS Patented Aug. 15, 1939

2,169,297

UNITED STATES PATENT OFFICE 2,169,297

WORKBOX

Harry E. Smith, Short Hills, N. J., assignor to Celluloid Corporation, a corporation of New Jersey Application February 25, 1937, Serial No. 127,704

1 Claim. (Cl. 223—107)

This invention relates to the production of work boxes from film, foil or sheet stock containing a thermoplastic base material such as nitrocellulose, an organic ester of cellulose, a cellulose ether, a mixed ether ester of cellulose, mixed esters of cellulose, or a mixture of the above, or a thermoplastic synthetic resin or polymerization product. The invention relates more particularly to such boxes made from transparent film, foil or sheet stock of a thermoplastic material, or made from film, foil or sheet stock which is opaque or translucent and which has a transparent portion therein.

An object of the invention is the economic and expeditious method of forming work boxes from thermoplastic materials. Another object of the invention is the construction of a work box which is adapted for use as a knitting, crocheting, weaving, sewing, embroidering, braiding, or tatting kit wherein the unused yarn is kept in a visible yet unsoiled condition and which has a separate compartment for the article being made. Other objects of the invention will appear from the following detailed description and drawing.

In the drawing, wherein like reference numerals refer to the same or similar elements in the respective views;

Fig. 1 is a perspective view of a work box made in accordance with this invention and employed as a crocheting kit illustrating the visibility of the unused yarn, the crocheted material and the position of the needle, Fig. 2 is a perspective view of a crocheting kit while being used, Fig. 3 is an elevational view, in section, of a work box, and Fig. 4 is a plan view, in partial section, taken on the line 4—4 of Fig. 3.

By employing this invention, fairly rigid though light containers may be made from relatively light weight film, foil or sheet stock of thermoplastic material. The side walls of the container may be formed of transparent, translucent or opaque material or they may be made of materials parts of which are transparent, translucent and/or opaque. Preferably materials at least a part of which is transparent are employed so that the amount of unused yarn remaining in the work box may be visible.

The work kits in accordance with this invention are not only attractive, novel in design and desirable in that the work may be seen, but they are also of great usefulness in that the unused yarn is kept clean, dry and free from handling which often results in the yarn becoming tangled.

The work box has utility especially for people who do such work in street cars, subways, buses, etc., in that the work may be readily packed or unpacked from the box and the unused yarn cannot become tangled or knocked to the floor, etc.

By employing thermoplastic materials which vary in transparency, color design, etc., the work box can be made highly decorative. For instance, designs, mottled effects, imitation marble or onyx effects, patterns, decalcomanias, etc. in or on thermoplastic materials may be employed as the material of the side walls, tops and bottoms of the boxes.

In accordance with this invention, I form boxes from thermoplastic film, foil or sheet material in such a manner that there is produced a box having a bottom closure member and having a shelf attached to the inside of the side walls at a distance substantially above the bottom, said shelf supporting a utility tray preferably having side walls and a perforated bottom, and a removable closure at the top of the box. The tray adapted to rest upon the shelf of the box preferably comprises a bottom member that acts as a partition for the main container. This tray is preferably equipped with holes through which knitting needles, crochet hooks, etc. may be passed and which thereby acts as a holder for same. Also attached to the tray is a tab or handle by means of which the tray may be removed from the box or inserted therein. The box is preferably but not necessarily formed with beaded edges top and bottom. The tray is also preferably formed with beaded edges top and bottom. The bottom of the box and tray are preferably held to their respective side walls by means of the beading.

This invention is applicable to the formation of boxes or containers from any suitable thermoplastic film, foil or sheet material. For instance, the side walls of the boxes or containers may be made from thermoplastic materials containing nitrocellulose of any suitable degree of nitration, or the organic derivatives of cellulose, such as the organic esters of cellulose and cellulose ethers. Examples of the organic esters of cellulose are cellulose acetate, cellulose butyrate, cellulose formate and cellulose propionate, while examples of the cellulose ethers are ethyl cellulose, methyl cellulose and benzyl cellulose. The side walls of the boxes or containers may also be made from the mixed ether-esters of cellulose such as ethyl cellulose acetate, or the mixed esters of cellulose such as cellulose stearate-acetate and cellulose nitroacetate. This invention is also applicable to the formation of boxes or containers whose side walls contain thermoplastic resins and polymerization or condensation products such as urea-formaldehyde resins, phenol-formaldehyde resins, glycerol-phthalic anhydride resins or any of the polyhydric alcohol-polybasic acid resins, the polymerization products of vinyl chloride, vinyl acetate, their derivatives and substitution products, or mixtures of the same, also the polymerization products of acrylic acid esters such as methyl methacrylate. The thermoplastic material may also be made from or may contain synthetic rubbers known as Plioform, Duprene, Tornesite, etc.

This invention is of particular importance in the production of work boxes made wholly from thermoplastic materials. However, it is not necessary that the entire side walls, bottom, tray or closures be of thermoplastic materials. For instance, there may be made in accordance with this invention boxes whose side walls are of paper, cardboard, wood, metal, or other non-thermoplastic material and which have joined thereto as an end or an extension of the side wall a thermoplastic material. Furthermore, this invention is applicable to the formation of boxes from laminated materials such as a sheet material formed by placing a sheet of paper, cloth, metallic foil or other highly flexible material which may be printed, embossed or plain on a sheet of thermoplastic material or between sheets of thermoplastic material. Many novel effects may be produced by forming the side walls from laminated sheets of thermoplastic material. In this respect one sheet may be printed, engraved or embossed with yarns, sizes, colors, etc. or diagrams of stitch shapes or stitch patterns, with or without a measuring scale, etc., and this sheet covered with a transparent sheet and the laminated composite sheet formed into a work box or the inner sheet of the box formed from a lamination of two or more sheets may contain besides the ornamental effects the trade mark, emblem, etc. of the manufacturer of yarn who packages the yarn in such a box as an inducement for the sale thereof. Obviously, any of the designs employed in thermoplastic materials may be employed, for instance, those having stripe effects, imitation marble, those containing fibers, Lahn, scintillating metallic foils, threads, etc.

The film, foil or sheet material constituting at least one end of the boxes may be any suitable thermoplastic material and may contain any suitable effect materials, such as plasticizers, dyes or lakes, pigments, nacreous substances, filling materials, fire retardants, etc. For instance, the film, foil or sheet of thermoplastic material may be formed from cellulose acetate containing up to 20% of metal oxide pigment and from 10 to 150% of a suitable plasticizer, such as dibutyl tartrate, dimethyl phthalate, triacetin, and dimethoxy ethyl phthalate. Similarly other pigments and plasticizers may be used, depending upon the base material employed and the desired effect in the final product.

The thermoplastic sheet material may be of any suitable thickness. For the most part the thickness of the thermoplastic material will depend upon the size of the box and the amount of weight it is intended to carry. The thermoplastic material may be, for instance, of from .003 to 0.1 or more of an inch in thickness. The invention is primarily of importance, however, in the formation of boxes from films of thermoplastic material having a thickness from .003 to .025 of an inch. The bottom of the tray and the bottom of the box as well as the cover may be made of any suitable material. For instance, these parts may be made of the same material as the side walls of the box or they may be made of nonthermoplastic materials or of thermoplastic materials differing from the thermoplastic material of the side walls. In this respect combinations of color and decorative effects may be employed.

Boxes may be formed by any suitable method. However, it is preferable to form both the box and the tray in a manner described in U. S. application S. No. 121,792 filed January 22, 1937. Any of the materials, types or processes therein described may be employed in forming the work box of this invention.

The work box of this invention will now be described with particular reference to the drawing wherein one embodiment of the invention is shown. The box comprises side wall 1 formed of a thermoplastic material. Attached to the side wall 1 is a bottom closure member 2. The bottom closure member may be attached to the side wall in any suitable manner, for instance, by adhesives, cements, etc. It is preferable, however, to attach the bottom closure member to the side wall by simultaneously rolling portions of the two together into a bead 3. For the purpose of strengthening and lending rigidity to the box it is also preferable to form a bead 4 at the upper end of the box. These beads impart rigidity and the neat, smooth round edges lend a touch appeal to the work box.

At a distance from the bottom of the box, depending upon the type of yarn or size of the ball of yarn the box is intended to carry, is attached a ring 5. This ring may be in the form of a flat strip, a rod or tube. This ring 5 may be of thermoplastic material or non-thermoplastic material and may be attached to the box by means of cements, adhesives or by welding the thermoplastic material thereto by heat and pressure. The ring 5 acts as a shelf and is adapted to support a utility tray 6. This tray is adapted to carry tape measures, scissors, needles, pins and other small objects useful in the work. If desired a plurality of trays may be provided the upper trays resting upon the beaded edge of the lower tray or trays. Obviously the tray may be employed to retain the finished work.

The tray 6 is formed with side wall 7 and a bottom closure member 8. The wall 7 is made of thermoplastic material, which thermoplastic material may be the same or different thermoplastic material from the side wall of the box. Although the bottom closure member 8 may be attached to the side wall 7 in any suitable manner or may be made integral therewith by stamp molding methods, it is preferable to attach the two together with a bead 9 as described with reference to the bead 3. Similarly the top of the tray may be formed with a bead 11. The bottom closure member 8 may be provided with holes 12. Any suitable number of these holes may be employed. The edge of the hole 12 may be reinforced with a thermoplastic or metal eyelet 13. The object of these holes is to permit the passing of a knitting needle, crochet hook or other instrument 14 from the top of the box to the bottom and to retain the same. The tab or handle 15 is attached to the tray by means of one of the eyelets 13. This tab 15 may also be employed to fasten or catch the thread or yarn when the operator is through with her work. Although this tab is shown on the drawing attached to a central part of the bottom of the tray it is preferable to attach the same to one side thereof such that the tray may be easily tipped to clear the bead 4 when removing the tray from the box.

A cover 16 having a suitable box engaging wall 17 may be formed from the same or different material from that of the box and tray. The closure 16 may have a bead formed on the side wall 17 if desired.

The work box may be employed in several ways. For instance, a yarn manufacturer may use the work box as a display container in merchandising his goods giving the box with the sale of the yarn as an inducement to buy his yarn. In this instance, the ball of yarn is placed in the box under the tray. When the work box is used as a carrier for the work of a knitter, crocheter, etc. the end of the yarn from the ball is passed through one of the holes 12 to the box. The box may be supported on the worker's lap, floor, table or otherwise and there is no opportunity of the yarn to become soiled or tangled. When the period of work is ended the finished part is placed on the tray and the instrument employed in the work is passed through one of the holes 12 and the cover applied. In this manner the work is kept free from dust, dirt or unraveling.

If desired, there may be attached to the box a strap of thermoplastic material acting as a handle or the box may be threaded with ribbons to add both a decorative effect and also to act as a handle. Furthermore, if desired, the closure member 16 may be attached to the box by means of a hinge and have a fastener for maintaining the same in a closed position. In this instance the strap or handle may be attached directly to the closure member 16.

In the drawing there is shown a cylindrical form of work box, but it is obvious that the sides do not necessarily have to be round. The work box may be made triangular, square, oblong or polysided in cross section. Hexagonal or other polysided work boxes prevent them from rolling off a table when the boxes are resting on their side.

It is to be understood that the foregoing detailed description is given merely by way of illustration and that many variations may be made therein without departing from the spirit of my invention.

Having described my invention, what I desire to secure by Letters Patent is:

A portable work box for use in hand knitting, crocheting, sewing and similar operations, comprising a receptacle of transparent, flexible derivative of cellulose material, a shelf fixed to the inner side walls of said receptacle, a tray supported on said shelf forming two compartments therein, one of said compartments being adapted to receive a yarn package and the other compartment being adapted to receive the article being worked upon, said tray having an opening therein forming a communicating passage between said compartments and through which the yarn is adapted to be led, an eyelet in said opening and a tab attached to said tray by said eyelet, the construction arrangement of said tab being such that it acts as a handle by which the said tray is raised and as a means for fastening the yarn of said yarn package.

HARRY E. SMITH.